UNITED STATES PATENT OFFICE.

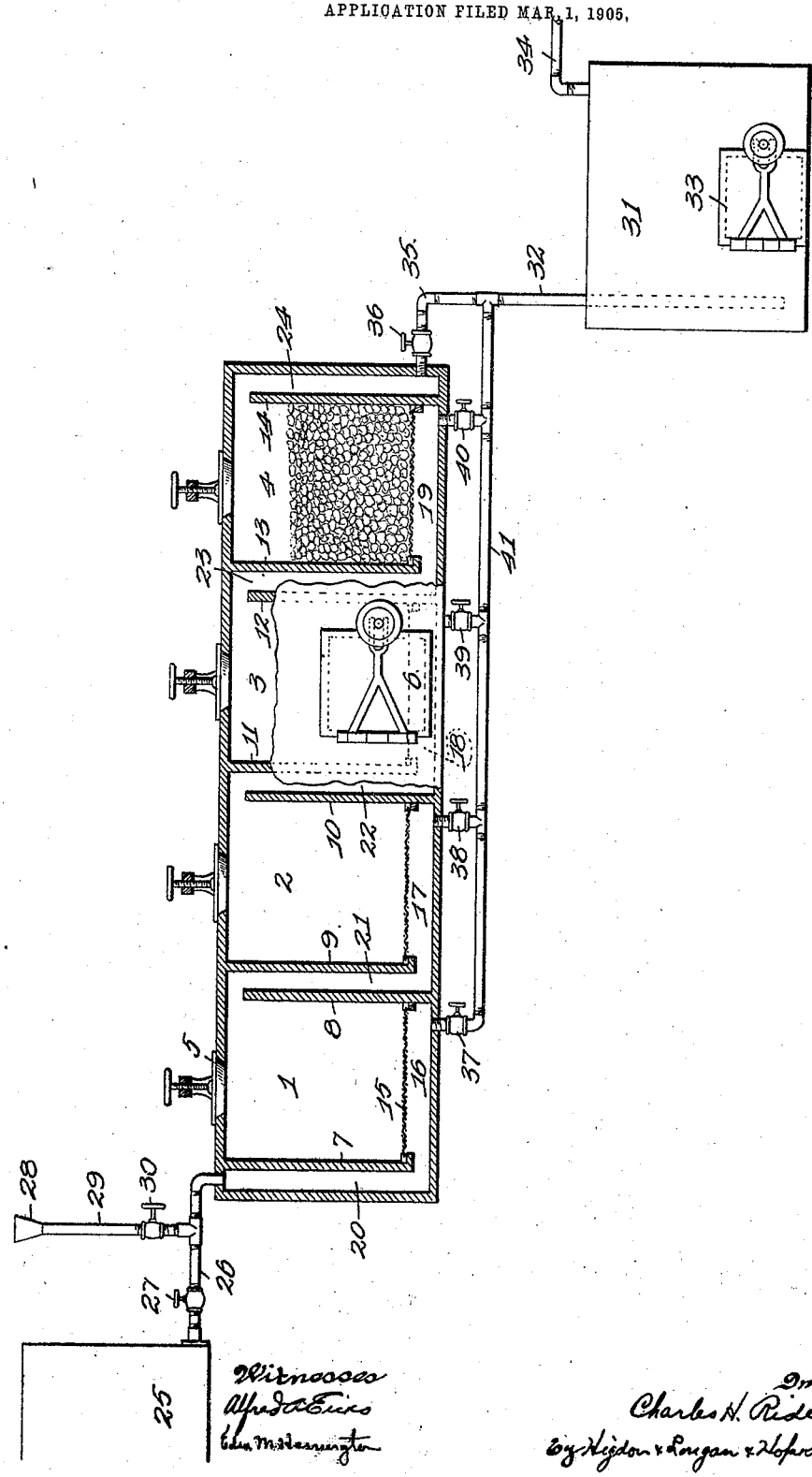

CHARLES H. RIDER, OF ST. LOUIS, MISSOURI.

APPARATUS FOR DISSOLVING AND SEPARATING VALUES CONTAINED IN ORES, &c.

No. 805,880. Specification of Letters Patent. Patented Nov. 28, 1905.

Application filed March 1, 1905. Serial No. 247,862.

*To all whom it may concern:*

Be it known that I, CHARLES H. RIDER, a citizen of the United States, and a resident of the city of St. Louis, Missouri, have invented certain new and useful Improvements in Apparatus for Dissolving and Separating Values Contained in Ores and other Substances, of which the following is a specification containing a full, clear, and exact description, reference being had to the accompanying drawing, forming a part hereof.

My invention relates to improvements in an apparatus for dissolving and separating the values contained in ores and other substances; and it consists of the useful features herein shown, described, and claimed.

In the drawing which forms a part of this specification the main tank, as shown, is divided into four compartments 1, 2, 3, and 4, provided with air-tight manholes 5, leading down into said compartments, and provided with air-tight doors 6, leading through one of the side walls into each compartment. The compartments are formed by transverse walls, there being an underflow-wall 7 at the front side of the compartment 1, an overflow-wall 8 at the rear side of the compartment 1, an underflow-wall 9 at the front side of the compartment 2, an overflow-wall 10 at the rear side of the compartment 2, an underflow-wall at the front side of the compartment 3, an overflow-wall 12 at the rear side of the compartment 3, an underflow-wall 13 at the front side of the compartment 4, and an overflow-wall 14 at the rear of the compartment 4.

Foraminous bottoms 15 are placed in the compartments 1, 2, 3, and 4 between the underflow-walls and the overflow-walls, said foraminous bottoms being elevated above the main bottom of the tank to form chambers 16, 17, 18, and 19. A passage 20 leads downwardly in front of the walls 7 to the chamber 16. A passage 21 leads downwardly between the walls 8 and 9 to the chamber 17. A passage 22 leads downwardly between the walls 10 and 11 to the chamber 18. A passage 23 leads downwardly between the walls 12 and 13 to the chamber 19, and a passage 24 leads downwardly between the wall 14 and the end wall of the tank. A supply-tank 25 is mounted on a plane above the main tank, and a pipe 26 leads from the bottom of the supply-tank to the top of the passage 20, the flow through said pipe 26 being controlled by the valve 27. A tube-funnel 28 is mounted on a level above the tank 25 upon the pipe 29, said pipe 29 connecting the funnel to the pipe 26 and the flow through the pipe 29 being controlled by the valve 30. The fluid-receiving tank 31 is mounted on a level below the main tank, and a pipe 32 descends to near the bottom of tank 31. An air-tight door 33 provides access to the tank 31, and the outlet-pipe 34, connected at top of air-tight tank 31, may be connected to a filter or air-pump or other means of creating a vacuum for drawing fluid or gases from the top, bottom, through, or from the ore or other substance contained in one or all of the receiving-compartments 1, 2, 3, and 4. A pipe 35 leads from the bottom of the passage 24 to the pipe 32, the flow through said pipe being controlled by valve 36. Valves 37, 38, 39, and 40 control passages leading from the bottom of the chambers 16, 17, 18, and 19, said valves being connected to a common pipe 41, which is in turn connected to the pipe 32.

For the purpose of showing the workings of the apparatus I will describe its work in treating a gold-bearing ore, using as a dissolving reagent an aqueous solution of potassium cyanid (KCN) of the desired strength and quantity as shown to be required by previous analysis of the ore. The crushed ore is placed in the compartments 1, 2, 3, and 4. All the valves are closed except those in exit-pipes 32 and 34, and the solution of cyanid of potassium is placed in solution-supply tank 25, the valve 27 is manipulated so as to regulate the flow of the cyanid solution, and the valve 30 is manipulated so as to regulate the supply of air or other oxidizing reagent, as required by the reaction between the gold and cyanid of potassium, thus:

$$2Au + 4KCy + O + H_2O =$$ 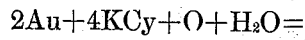
$$2AuCy.KCy + 2KOH.$$ 

The valve 36 is opened and the flow is downward through the passage 20 and upwardly through the ore in compartment 1, downwardly through the passage 21, upwardly through the ore in compartment 2, downwardly through the passage 22, upwardly through the ore in compartment 3, downwardly through the passage 23, upwardly through the ore in compartment 4, downwardly through the passage 24, through the valve 36 to the tank 31. The flow may be increased to any desired extent by applying exhaust means to the pipe 34. After the ore is treated to the desired extent the valves 37, 38, 39, and 40 are opened and the fluid withdrawn from the compartments to tank 31, and then the residuum in compartments 1, 2, 3, and 4 may be washed with water by placing the water into tank 25 and passing it through the device, or water may be admitted through funnel-tube 28. After the residuum has been freed from the gold values and the resulting fluid has been all discharged into tank 31 the gold is precipitated by any suitable reagent.

In using the apparatus to extract the values contained in organic substances—such as barks, leaves, roots, &c.—the manipulation of the adjustable parts of the apparatus is the same as when treating an ore, using tank 25 to hold and supply the desired solvent—such as water, alcohol, &c.—and the compartments 1, 2, 3, and 4 to hold the barks, leaves, roots, &c., or any organic substance requiring leaching, percolating, or steaming, as the device is adapted to the use of hot or cold solutions, or steam or gas, as may be required to use for the proper extraction of the desired values.

I claim—

1. A device of the class described, consisting of a single closed tank divided into compartments, by partitions arranged to admit the passage of suitable agents, such as gas, fluid or air to the bottom of the first compartment upwardly through the compartment then to the bottom of the second compartment and upwardly through the second compartment, and so on through the series; air-tight manholes in the tops of the compartments; air-tight doors in the sides thereof; and an air-tight tank arranged to receive the liquid from said compartments.

2. A device of the class described, consisting of a single closed tank divided into compartments by partitions arranged to admit the passage of suitable agents, such as gas, fluid or air to the bottom of the first compartment upwardly through the compartment, then to the bottom of the second compartment and upwardly through the second compartment, and so on through the series; air-tight manholes in the tops of the compartments; air-tight doors in the sides thereof; and an air-tight tank arranged to receive the liquid from said compartments, there being connections between the receiving-tank and the top of the last compartment; and there being connections between the receiving-tank and the bottom of each compartment.

3. A device of the class described, consisting of a single closed tank divided into compartments by partitions arranged to admit the passage of suitable agents to the bottom of the first compartment upwardly through the compartment, then to the bottom of the second compartment, and so on through the series; air-tight manholes in the tops of the compartments; air-tight doors in the sides thereof; and an air-tight tank arranged to receive the liquid from said compartments; means of admitting the dissolving agents to the passage; and means of admitting oxidizing agents to the passage.

In testimony whereof I have signed my name to this specification in presence of two subscribing witnesses.

CHARLES H. RIDER.

Witnesses:
ALFRED A. EICKS,
JOHN C. HIGDON.